United States Patent
Khanzode et al.

(10) Patent No.: US 9,739,355 B2
(45) Date of Patent: Aug. 22, 2017

(54) DUAL CLUTCH TRANSMISSION WITH CONTINUOUSLY VARIABLE FINAL DRIVE ASSEMBLY

(71) Applicant: GM Global Technology Operations LLC, Detroit, MI (US)

(72) Inventors: Tushar P. Khanzode, Nagpur (IN); Sachin Chandrakant Pagare, Nashik (IN)

(73) Assignee: GM Global Technology Operations, LLC, Detroit, MI (US)

( * ) Notice: Subject to any disclaimer, the term of this patent is extended or adjusted under 35 U.S.C. 154(b) by 201 days.

(21) Appl. No.: 14/725,007

(22) Filed: May 29, 2015

(65) Prior Publication Data
US 2016/0348777 A1  Dec. 1, 2016

(51) Int. Cl.
F16H 3/08 (2006.01)
F16H 37/02 (2006.01)
F16H 3/093 (2006.01)

(52) U.S. Cl.
CPC ... *F16H 37/021* (2013.01); *F16H 2003/0931* (2013.01); *F16H 2200/0043* (2013.01)

(58) Field of Classification Search
CPC ............ F16H 37/021; F16H 2003/0931
USPC .................... 74/330, 331, 333, 340
See application file for complete search history.

(56) References Cited

U.S. PATENT DOCUMENTS

| | | | | |
|---|---|---|---|---|
| 3,442,346 A | * | 5/1969 | Mann | B60K 17/08 180/247 |
| 4,489,622 A | * | 12/1984 | Underwood | F16H 37/021 192/48.612 |
| 2004/0149080 A1 | * | 8/2004 | Pollak | B60K 17/34 74/661 |
| 2005/0255948 A1 | * | 11/2005 | Chonan | B62K 5/01 474/23 |
| 2015/0337931 A1 | * | 11/2015 | Walter | F16H 37/022 475/210 |
| 2016/0208895 A1 | * | 7/2016 | Uchino | F16H 37/021 |

OTHER PUBLICATIONS

Yohei Shimokawa, "Technology Development to Improve Jatco CVT8 Efficiency," SAE International, Apr. 8, 2013, pp. 1-8, 2013-01-0364, SAE International, USA.

* cited by examiner

*Primary Examiner* — Ha D Ho

(57) ABSTRACT

A dual clutch transmission includes a pair of concentric clutches which selectively drive a pair of concentric drive shafts, pairs of gears in constant mesh, a first portion of which are associated with the first drive shaft and a first, parallel countershaft and a second portion of which are associated with the second drive shaft and a second, parallel countershaft. Synchronizer clutches disposed adjacent the gears on the countershafts selectively connect the gears to the countershafts. Both countershafts drive a single output shaft through transfer gears. The output shaft is coupled to a drive (input) pulley of a continuously variable final drive assembly which receives a chain which drives a driven (output) pulley which is coupled to and drives the cage of a differential assembly. A pair of axles are driven by the side gears of the differential and, in turn, drive the vehicle wheel.

17 Claims, 2 Drawing Sheets

DUAL CLUTCH TRANSMISSION WITH CONTINUOUSLY VARIABLE FINAL DRIVE ASSEMBLY

FIELD

Figure 1:
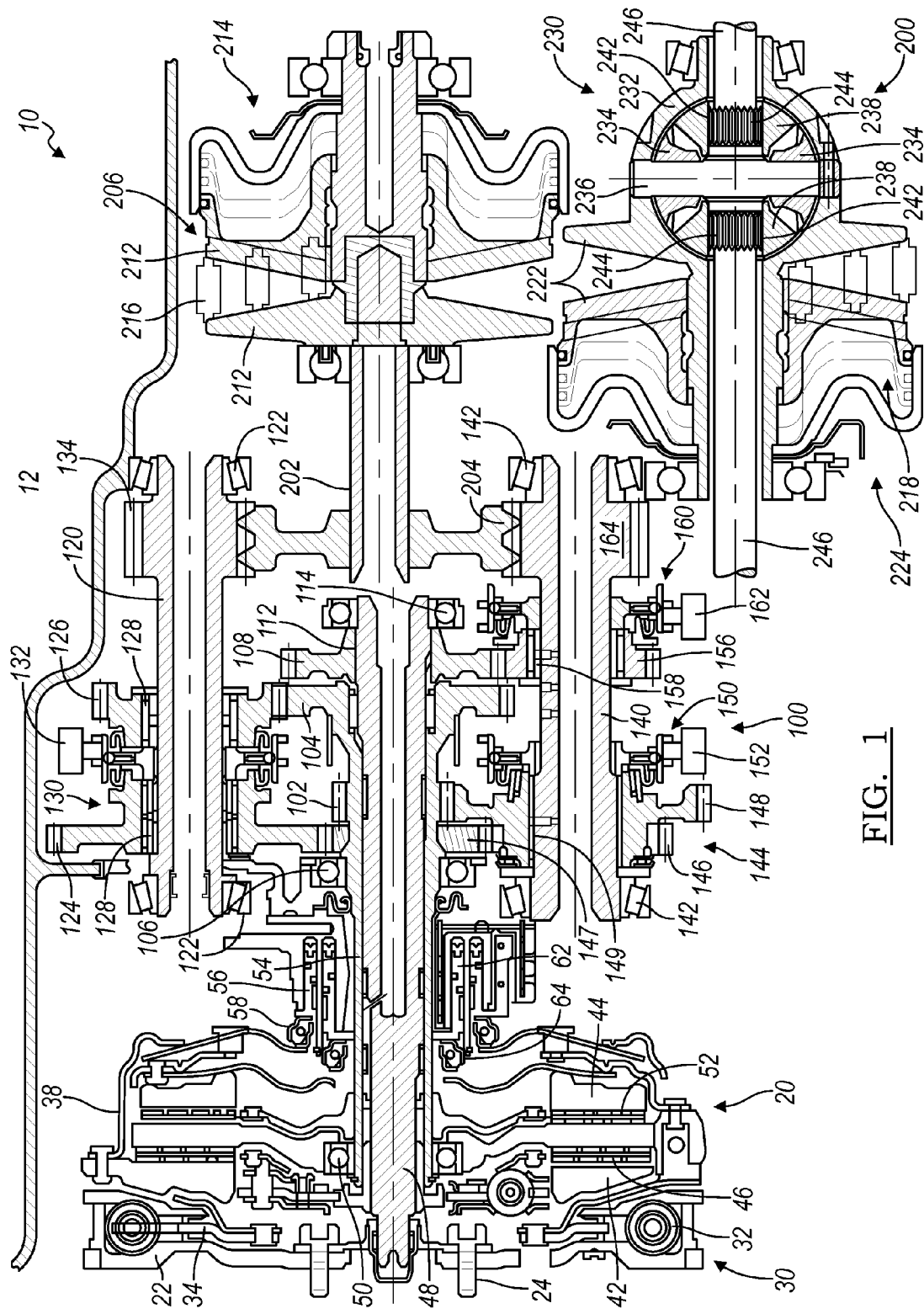

The present disclosure relates to dual clutch transmissions and more particularly to a dual clutch transmission having a continuously variable final drive assembly.

BACKGROUND

The statements in this section merely provide background information related to the present disclosure and may or may not constitute prior art.

For the last several years, dual clutch transmissions have represented a significant alternative to more conventional automatic motor vehicle transmissions which typically comprise several planetary gear sets, clutches and brakes. A defined sequence of engagement and disengagement of the clutches and brakes steps the transmission through the available gear ratios. In contrast to such direct, sequenced operation, a dual clutch transmission includes a pair of main clutches that alternately engage to provide torque through a previously selected gear pair disposed between a shaft driven by the clutch and a countershaft.

One of the drawbacks of dual clutch transmissions, especially when they include six, seven eight or more gear ratios is their axial length. Given certain motor vehicle platforms, axial length is critical and may limit the number of gears provided by a dual clutch transmission. Current market demand is for vehicles with relatively high numbers of gear ratios, i.e., seven, eight and higher and thus a vehicle with only five or six gears, though desirable from every other standpoint, may be viewed by the consumer as having lesser value. A second, though less apparent drawback of such transmissions, is their relatively high spin losses resulting from the large number of gears sets in constant mesh and rotation in spite of the fact that only one gear set at a time is active and transferring torque.

The present invention addresses these problems and provides a dual clutch transmission with reduced length and reduced spin losses.

SUMMARY

The present invention provides a dual clutch transmission having a continuously variable final drive assembly. The dual clutch transmission includes a pair of concentric clutches which selectively drive a pair of concentric drive shafts, pairs of gears in constant mesh, a first portion of which are associated with the first drive shaft and a first, parallel countershaft and a second portion of which are associated with the second drive shaft and a second, parallel countershaft. Synchronizer clutches disposed adjacent the gears on the countershafts selectively synchronize and connect the gears to the countershafts. Both countershafts drive a single output shaft through transfer gears. The output shaft is coupled to a drive (input) pulley of a continuously variable final drive assembly which receives a chain which drives a driven (output) pulley. The output pulley is coupled to and drives the cage of a differential assembly. A pair of output shafts or axles are driven by the side gears of the differential and, in turn, drive the vehicle wheels.

Thus it is an aspect of the present invention to provide a motor vehicle transmission having a continuously variable final drive assembly.

It is a further aspect of the present invention to provide a dual clutch motor vehicle transmission having a continuously variable final drive assembly.

It is a still further aspect of the present invention to provide a dual clutch transmission having concentrically disposed input clutches and a continuously variable final drive assembly.

It is a still further aspect of the present invention to provide a dual clutch transmission having concentrically disposed input clutches and drive shafts and a continuously variable final drive assembly.

It is a still further aspect of the present invention to provide a dual clutch transmission having concentrically disposed input clutches and drive shafts, a pair of parallel countershafts and a continuously variable final drive assembly.

It is a still further aspect of the present invention to provide a dual clutch transmission having concentrically disposed input clutches and drive shafts, a pair of parallel countershafts, pairs of meshing gears disposed between the drive shafts and the countershafts and a continuously variable final drive assembly.

It is a still further aspect of the present invention to provide a dual clutch transmission having concentrically disposed input clutches and drive shafts, a pair of parallel countershafts, pairs of meshing gears disposed between the drive shafts and the countershafts, synchronizer clutches disposed adjacent the gears on the countershafts and a continuously variable final drive assembly.

It is a still further aspect of the present invention to provide a dual clutch transmission having concentrically disposed input clutches and drive shafts, a pair of parallel countershafts, pairs of meshing gears disposed between the drive shafts and the countershafts, synchronizer clutches disposed adjacent the gears on the countershafts and a continuously variable final drive assembly having a pair of adjustable diameter pulleys and a chain encircling both pulleys.

It is a still further aspect of the present invention to provide a dual clutch transmission having concentrically disposed input clutches and drive shafts, a pair of parallel countershafts, pairs of meshing gears disposed between the drive shafts and the countershafts, synchronizer clutches disposed adjacent the gears on the countershafts and a continuously variable final drive assembly including a differential.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
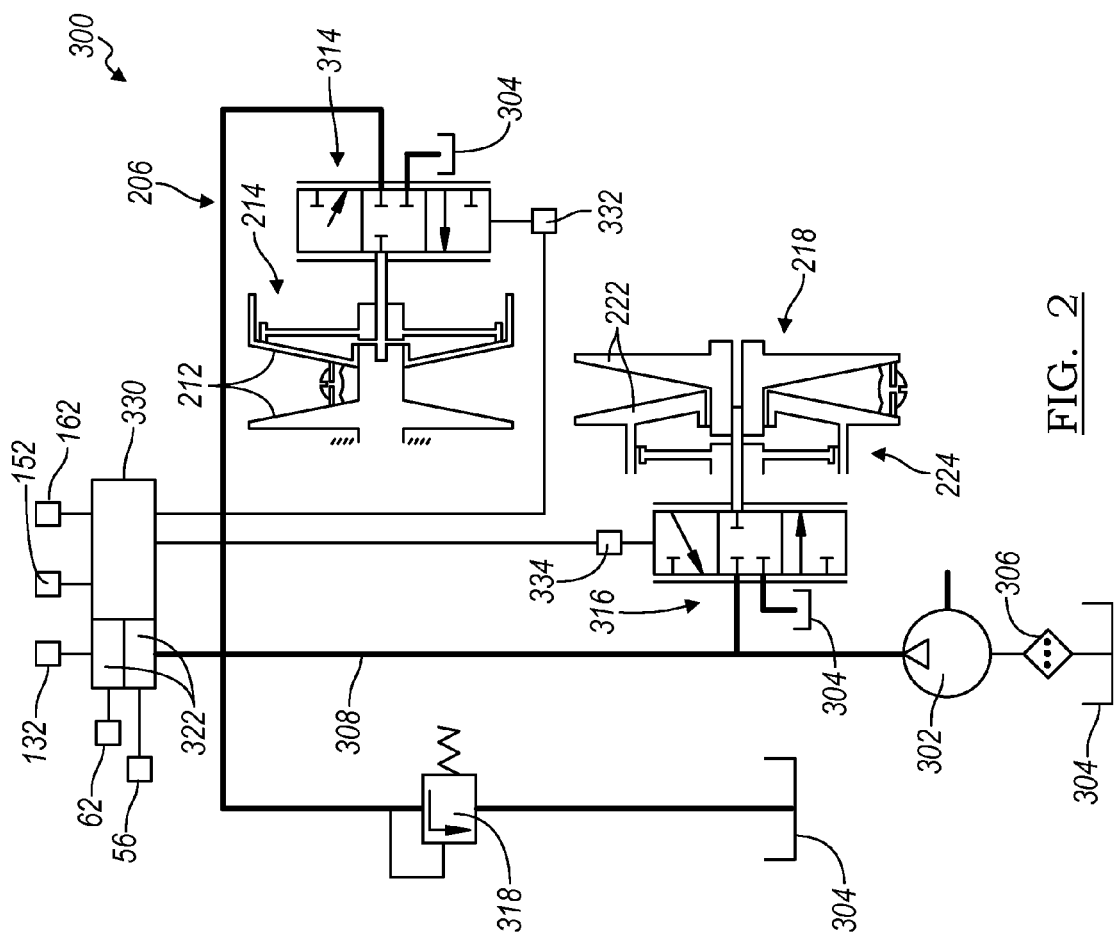

FIG. 1 is a schematic, full sectional view of a dual clutch transmission having a continuously variable final drive assembly according to the present invention; and FIG. 2 is a schematic diagram of the hydraulic circuit of a dual clutch transmission having a continuously variable final drive assembly according to the present invention.

DETAILED DESCRIPTION

The following description is merely exemplary in nature and is not intended to limit the present disclosure, application, or uses.

With reference to FIG. 1, a dual clutch transmission having a continuously variable final drive assembly is illustrated and generally designated by the reference number 10. The dual clutch transmission 10 includes a cast metal housing 12 which surround, protects and locates the various internal components of the dual clutch transmission 10 such as the dual clutch assembly 20, the transmission assembly 100 and the continuously variable final drive assembly 200.

The dual clutch assembly 20 includes an input plate or member 22 which is secured to the output flange of a prime mover such as an internal combustion engine or hybrid power plant (all not illustrated) by suitable threaded fasteners 24. The input plate or member 22 is a component of a damper assembly 30 having a plurality of circumferentially disposed compression springs 32 operably disposed between the input plate or member 22 and a similarly configured output plate or member 34 which is coupled to and rotationally drives an input member or housing 38 of the dual clutch assembly 20.

First and second clutch drive plates 42 and 44 rotate with the clutch housing 38. A first driven clutch plate 46 is splined to and drives a first or inner drive shaft 48 and a second driven clutch plate 52 is splined to and drives a second or outer drive shaft or quill 54. A ball bearing assembly 50 is disposed on the outer drive shaft or quill 54 between the first driven clutch plate 46 and the second driven clutch plate 52. The first driven clutch plate 46 is engaged to transfer torque to the first or inner drive shaft 48 by a first hydraulic operator 56 through a first throw out bearing 58 and the second driven clutch plate 52 is engaged to transfer torque to the second or outer drive shaft or quill 54 by a second hydraulic operator 62 through a second throw out bearing 64. The hydraulic circuit which provides pressurized hydraulic fluid to the hydraulic operators 56 and 62 is illustrated in FIG. 2.

Turning now to the transmission assembly 100, the second or outer drive shaft or quill 54 includes a first smaller diameter gear 102 and an axially spaced apart second, larger diameter gear 104. The gears 102 and 104 may be integrally formed with the outer drive shaft or quill 54 or may be fabricated separately and secured thereto by welding, staking, splines, an interference fit or a combination of these approaches. The outer drive shaft or quill 54 is preferably supported on a ball bearing assembly 106. The first or inner drive shaft 48 includes a third gear 108 having a diameter intermediate the gears 102 and 104 and typically is rotationally secured to the inner drive shaft 48 by an interengaging spline set 112. The inner shaft 48 may also be supported on a ball bearing assembly 114.

The transmission assembly 100 also includes a first countershaft or layshaft 120 and a second countershaft or layshaft 140. The first countershaft or layshaft 120 is preferably supported on a pair of tapered roller bearings 122. Freely rotatably disposed on the first countershaft or layshaft 120 is a first, larger diameter gear 124 that, in cooperation with other gears, provides reverse. Axially spaced from the first, larger diameter gear 124 is a second, smaller diameter gear 126 which, in cooperation with another gear, provides third gear. Both the gears 124 and 126 are preferably supported on needle bearings 128.

Disposed between the first gear 124 and the second gear 126 is a dual synchronizer clutch assembly 130. A three position actuator or operator 132 which may be hydraulically or electrically operated, translates the synchronizer clutch assembly 130 to the left to synchronize and connect the first, larger diameter gear 124 to the first countershaft or layshaft 120 to provide reverse, to the right to synchronize and connect the second, smaller diameter gear 126 to the first countershaft or layshaft 120 to provide third gear or to a middle or intermediate position in which both gears 124 and 126 are disconnected from and free to rotate on the first countershaft or layshaft 120. The first counter shaft or layshaft 120 also includes a first helical output gear 134.

The second countershaft or layshaft 140 is preferably supported on a pair of tapered roller bearings 142. Freely rotatably disposed on the first countershaft or layshaft 120 is a compound gear 144 having a first smaller diameter gear 146 that, in cooperation with a reverse idler gear 147 behind the cutting plane of FIG. 1, and the first, larger diameter gear 124 on the first countershaft or layshaft 120 provides reverse, as noted above. The compound gear 144 also includes a second, larger diameter gear 148 which is in constant mesh with the first, smaller diameter gear 102 on the second or outer drive shaft or quill 54 and provides first gear. The compound gear 144 is preferably supported on needle bearing assemblies 149. The compound gear 144 may be a unitary component or the smaller diameter gear 146 and the larger diameter gear 148 may be fabricated separately and assembled by welding, staking, splines, an interference fit or a combination of these approaches. Immediately adjacent the compound gear 144 is a first, single synchronizer clutch assembly 150. A two position actuator or operator 152 which may be hydraulically or electrically operated, translates the synchronizer clutch assembly 130 to the left to synchronize and connect the compound gear 144 to the second countershaft or layshaft 140 to provide first gear or to the right to disconnect the compound gear 144 from the second countershaft or layshaft 140 so that it is free to rotate thereon.

Axially spaced from the compound gear 144 is a second, smaller diameter gear 156 which, is in constant mesh with the third gear 108 on the first or inner drive shaft 48 and provides second gear. The gear 156 is preferably supported on needle bearing assemblies 158. Immediately adjacent the second, smaller diameter gear 156 is a second, single synchronizer clutch assembly 160. A two position actuator or operator 162 which may be hydraulically or electrically operated, translates the synchronizer clutch assembly 160 to the left to synchronize and connect the second, smaller diameter gear 156 to the second countershaft or layshaft 140 to provide second gear or to the right to disconnect the second, smaller diameter gear 156 from the second countershaft or layshaft 140 so that it is free to rotate thereon. The second counter shaft or layshaft 140 also includes a second helical output gear 164.

It will be appreciated that, according to conventional dual clutch transmission operation, when one of the four gears 124, 126, 148 and 156 (three forward and one reverse) is synchronized and connected to their associated countershaft or layshaft 120 or 140, the clutch of the dual clutch assembly 20 driving the drive shaft 48 or 54 associated with the respective drive gear 102, 104 and 108 of the above-recited four gears is engaged.

Finally, turning to the continuously variable final drive assembly 200, an input shaft or quill 202 includes a helical gear 204 which is in constant mesh with and driven by the first helical output gear 134 of the first counter shaft 120 and the second helical output gear 164 of the second countershaft 140. The input shaft or quill 202 is coupled to and drives a variable diameter input pulley assembly 206 of the continuously variable final drive assembly 200. The input pulley assembly 206 includes a pair of symmetrically opposed drive pulley faces or segments 212 which are translated toward one another by a first hydraulic actuator 214. Partially encircling the pair of drive pulley segments 212 is a multi-link drive chain 216 which is shown on phantom in multiple positions. The multilink drive chain 216 also partially encircles a variable diameter output pulley assembly 218 which includes a pair of symmetrically opposed driven pulley faces or segments 222 which are translated toward one another by a second hydraulic actuator 224. Both of the hydraulic actuators 214 and 224 are, like the multi-link chain 216, shown in multiple positions. The circuit supplying hydraulic fluid to the actuators 214 and 224 is illustrated in FIG. 2

It will be appreciated that, first of all, the spacing of the drive pulley segments 212 and the driven pulley segments 222 occurs oppositely, that is, when the drive pulley segments 212 are close together and thus exhibit their largest effective diameter, the driven pulley segments 222 are far apart and exhibit their smallest effective diameter and vice versa and, second of all, pressurized hydraulic fluid is provided to the hydraulic actuators 214 and 224 to drive the pulley segments 212 and 222 together to create their largest effective diameters whereas hydraulic fluid is simply exhausted from the hydraulic actuators 214 and 224 to allow the pulley segments 212 and 222 to separate and achieve their smallest effective diameters.

The driven pulley segments 222 are coupled to and drive a differential assembly 230 having a cage 232 which may be integrally formed with one of the pulley segments 222 and which supports, in conventional fashion, a pair of center gears 234 on a stub shaft 236 and a pair of side gears 238 which are in constant mesh with the center gears 234. The side gears 238 include female splines 242 which receive and engage complementary male splines 244 on a pair of half shafts or axles 246 which preferably extend to and drive the vehicle wheels (not illustrated).

Referring now to FIG. 2, a hydraulic circuit 300 for the dual clutch transmission 10 according to the present invention is illustrated. The hydraulic circuit 300 includes a hydraulic pump 302 which draws hydraulic fluid (transmission oil) from a transmission sump 304 through a filter 306. Pressurized hydraulic fluid from the pump 302 is supplied in a line 308 to a pair of proportioning control valves, a first control valve 314 associated with the actuator 214 of the input pulley assembly 206 and a second control valve 316 associated with the actuator 224 of the output pulley assembly 218.

The control valves 314 and 316 may be any type of proportioning valves such as, for example, spool valves, capable of providing a modulating or proportioning supply of hydraulic fluid to the actuators 214 and 224 to increase the effective diameters of the pulleys segments 212 and 222, maintaining the pressure of such supplied fluid to maintain a position of the actuators 214 and 224 and the pulley segments 212 and 222 and to control release of hydraulic fluid from the actuators 214 and 224 to reduce the effective diameters of the pulley segments 212 and 222. Thus, they may be hydraulically or electrically controlled. Of course, and as noted above, the actions of increasing or decreasing the effective diameters of the pulley segments 212 and 222 occur in opposition, that is, as the effective diameter of one pulley and its segments increases, the effective diameter of the other pulley and its segments decreases to provide an essentially constant length path for the multi-link chain 216.

Preferably, the circuit 300 also includes a pressure relief valve 318 which may return fluid to the sump 304 under certain operating conditions. Preferably as well, pressurized hydraulic fluid may be supplied to multiple valves 322 controlled by a control module such as a transmission control module (TCM) 330 which selectively supply pressurized hydraulic fluid to the first and second hydraulic clutch operators 56 and 62 and either hydraulic fluid or electrical signals to the actuators or operators 132, 152 and 162 of the synchronizer clutch assemblies 130, 150 and 160 as well as a respective pair of operators 332 and 334 of the control valves 314 and 316.

The dual clutch transmission 10 of the present design provides excellent ratio flexibility due to the use of both fixed ratio gear sets and the variable ratio final drive. The elimination of several gear pairs from the dual clutch portion of the transmission results in a transmission having shorter length and thus reduced mass and concomitant cost savings. The shorter length provides increased application options, especially in compact vehicle platforms. Finally, elimination of several gear pairs also results in lower spin losses relative to a dual clutch transmission with a full complement of gears and gear ratios.

It should be appreciated, however, that although the transmission assembly 100 of the present invention is illustrated and described as having three forward gears, this configuration is exemplary only. Due to the wide ratio range available from the continuously variable final drive assembly 200, which need not necessarily be entirely utilized, a transmission assembly 100 having but two forward gears or four five or six, for example, would be practical and appropriate with certain prime movers and in certain applications.

The description of the invention is merely exemplary in nature and variations that do not depart from the gist of the invention are intended to be, and are, within the scope of the invention. Such variations are not to be regarded as a departure from the spirit and scope of the invention.

What is claimed is:

1. A motor vehicle transmission comprising, in combination,
   a first clutch for selectively driving a first transmission drive shaft,
   a second clutch for selectively driving a second transmission drive shaft,
   a least a first gear secured to said first transmission drive shaft and at least a second gear secured to said second transmission drive shaft,
   a first countershaft adjacent said first transmission drive shaft and a freely rotatable third gear on said first countershaft in mesh with said first gear,
   a first synchronizer clutch operably disposed between said third gear and said first countershaft,
   a second countershaft adjacent said second transmission drive shaft and a freely rotatable fourth gear on said second countershaft in mesh with said second gear,
   a second synchronizer clutch operably disposed between said fourth gear and said second countershaft,
   a first output gear on said first countershaft and a second output gear on said second countershaft, said first and said second output gears meshing with a transmission output gear,
   a continuously variable drive assembly having an input pulley driven by said transmission output gear, an output pulley, a chain partially encircling said input and output pulleys and actuators for adjusting the effective diameters of said pulleys, and
   a differential assembly coupled to said output pulley of said continuously variable assembly and a pair of shafts coupled to and driven by a respective pair of side gears in said differential assembly.

2. The motor vehicle transmission of claim 1 further including an input member for driving said first and said second clutches.

3. The motor vehicle transmission of claim 1 further including a damper assembly having an output coupled to said first and second clutches.

4. The motor vehicle transmission of claim 1 wherein said first and second countershafts are parallel to said transmission drive shafts.

5. The motor vehicle transmission of claim 1 wherein said differential assembly includes a cage and said cage is integral with said output pulley of said continuously variable drive assembly.

6. A dual clutch motor vehicle transmission comprising, in combination,
an input member,
a first clutch coupled to said input member and selectively driving a first transmission drive shaft,
a second clutch coupled to said input member and selectively driving a second transmission drive shaft,
a least a first gear secured to said first transmission drive shaft and at least a second gear secured to said second transmission drive shaft,
a first countershaft disposed parallel to said first transmission drive shaft and a freely rotatable third gear on said first countershaft in mesh with said first gear,
a first synchronizer clutch disposed between said third gear and said first countershaft,
a second countershaft disposed parallel to said second transmission drive shaft and a freely rotatable fourth gear on said second countershaft in mesh with said second gear,
a second synchronizer clutch disposed between said fourth gear and said second countershaft,
a first output gear on said first countershaft and a second output gear on said second countershaft, said first and said second output gears both meshing with a transmission output gear,
a continuously variable drive assembly having an input pulley coupled to and driven by said transmission output gear, an output pulley, a multi-link chain partially encircling said input and output pulleys and actuators for adjusting the effective diameters of said pulleys, and
a differential having a cage coupled to said output pulley of said continuously variable assembly and a pair of shafts coupled to and driven by a respective pair of side gears in said differential cage.

7. The dual clutch motor vehicle transmission of claim 6 further including a damper assembly operably disposed between said input member and said first and second clutches.

8. The dual clutch motor vehicle transmission of claim 6 wherein said gears disposed on said countershafts include needle bearing assemblies.

9. The dual clutch motor vehicle transmission of claim 6 wherein said differential cage is integral with said output pulley of said continuously variable drive assembly.

10. The dual clutch motor vehicle transmission of claim 6 wherein said actuators are hydraulic actuators.

11. The dual clutch motor vehicle transmission of claim 6 further including first and second hydraulic actuators for engaging and disengaging said first and second clutches.

12. A dual clutch motor vehicle transmission comprising, in combination,
an input member adapted to be driven by a prime mover,
a damper assembly coupled to said input member
a first clutch coupled to said damper assembly and selectively driving a first transmission drive shaft,
a second clutch coupled to said damper assembly and selectively driving a second transmission drive shaft,
a least a first gear secured to said first transmission drive shaft and at least a second gear secured to said second transmission drive shaft,
a first countershaft disposed parallel to said first transmission drive shaft and a freely rotatable third gear on said first countershaft in mesh with said first gear on said first transmission drive shaft,
a first synchronizer clutch operably disposed between said third gear and said first countershaft,
a second countershaft disposed parallel to said second transmission drive shaft and a freely rotatable fourth gear on said second countershaft in mesh with said second gear on said second transmission drive shaft,
a second synchronizer clutch operably disposed between said fourth gear and said second countershaft,
a first output gear on said first countershaft and a second output gear on said second countershaft, said first and said second output gears both meshing with a transmission output gear,
a continuously variable drive assembly having an input pulley coupled to and driven by said transmission output gear, an output pulley, a multi-link chain partially encircling said input and output pulleys and actuators for adjusting the effective diameters of said pulleys, and
a differential having a cage coupled to said output pulley of said continuously variable assembly and a pair of shafts coupled to and driven by a respective pair of side gears in said differential cage.

13. The dual clutch motor vehicle transmission of claim 12 wherein said damper assembly includes a plurality of compression springs.

14. The dual clutch motor vehicle transmission of claim 12 wherein said differential cage is integral with said output pulley of said continuously variable drive assembly.

15. The dual clutch motor vehicle transmission of claim 12 further including first and second hydraulic actuators for engaging and disengaging said first and second clutches.

16. The dual clutch motor vehicle transmission of claim 12 wherein said differential includes a pair of center gears in constant mesh with said pair of side gears.

17. The dual clutch motor vehicle transmission of claim 12 wherein said actuators for adjusting the effective diameters of said pulleys are hydraulic actuators.

* * * * *